Figure 1:
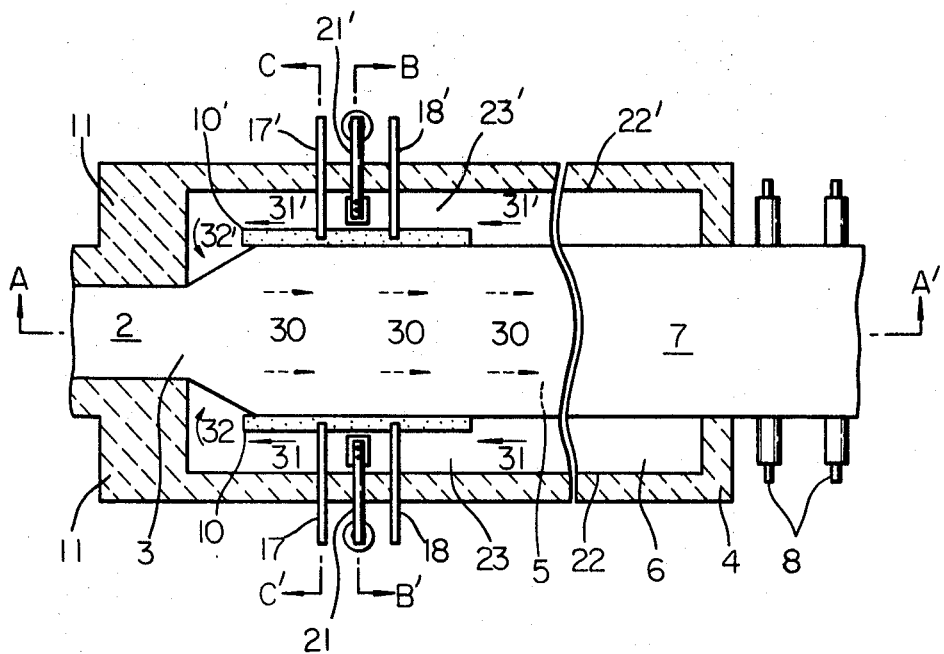

United States Patent

[11] 3,607,203

| | | |
|---|---|---|
| [72] | Inventors | Yukiya Fujimoto;<br>Masanari Matsushita, both of Kyoto-fu, Japan |
| [21] | Appl. No. | 741,361 |
| [22] | Filed | July 1, 1968 |
| [45] | Patented | Sept. 21, 1971 |
| [73] | Assignee | Nippon Sheet Glass Co., Ltd.<br>Osaka, Japan |
| [32] | Priority | July 7, 1967 |
| [33] | | Japan |
| [31] | | 42/43712 |

[54] FLOAT GLASS APPARATUS WITH LONGITUDINAL DAMS AND METAL FLOW CONTROL MEANS
10 Claims, 7 Drawing Figs.

[52] U.S. Cl. .................................................. 65/182 R, 65/99 A
[51] Int. Cl. ....................................................... C03b 18/02
[50] Field of Search ........................................... 65/99, 182, 27, 168

[56] References Cited
UNITED STATES PATENTS

| | | | |
|---|---|---|---|
| 3,220,813 | 11/1965 | Nogard et al. ................. | 65/182 X |
| 3,330,635 | 7/1967 | Loukes et al. ................. | 65/182 X |
| 3,395,996 | 8/1968 | Loukes .......................... | 65/182 X |
| 3,409,423 | 11/1968 | De Lajarte ..................... | 65/182 X |
| 3,479,171 | 11/1969 | Robinson et al. .............. | 65/182 X |
| 3,487,659 | 1/1970 | Ito et al. ......................... | 65/99 X |

*Primary Examiner*—S. Leon Bashore
*Assistant Examiner*—J. B. Hardaway
*Attorney*—Wenderoth, Lind & Ponack

ABSTRACT: Apparatus for manufacturing glass ribbon on a bath of molten metal, comprising a tank for holding the bath and a pair of dams disposed in the bath for constituting a path for the floating glass ribbon therebetween, characterized in that between each side wall of the tank and the dam facing it there is provided means for controlling the flow of the molten metal, including apparatus to set up a forced flow of variable rate and longitudinal direction.

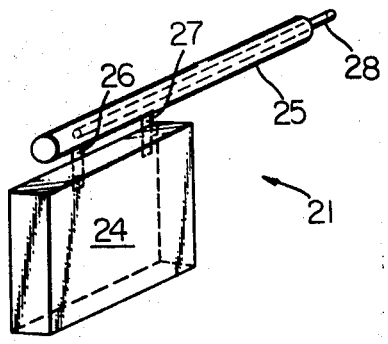
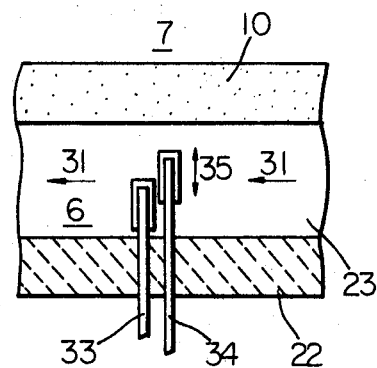
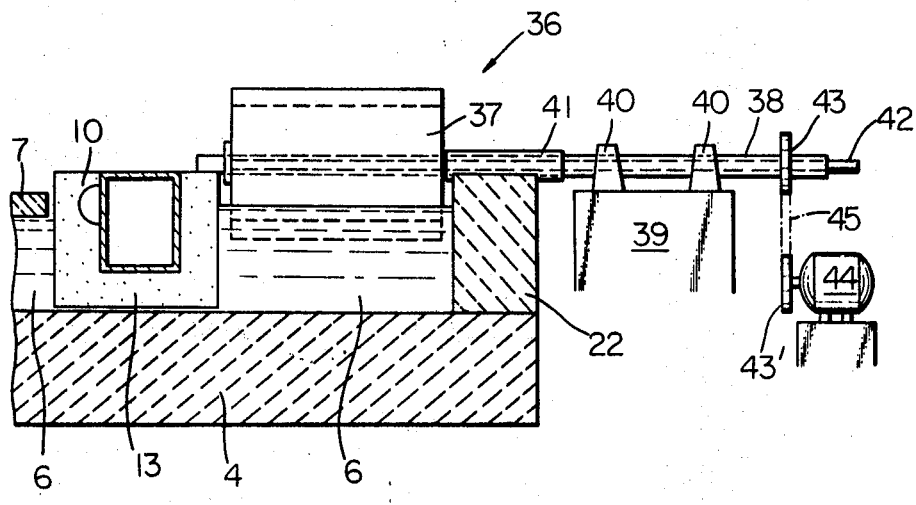

FLOAT GLASS APPARATUS WITH LONGITUDINAL DAMS AND METAL FLOW CONTROL MEANS

This invention relates to an apparatus for manufacturing flat glass continuously using a molten metal bath and, in particular, to an apparatus for manufacturing flat glass of good quality by controlling the flow of the molten metal of the bath thereof.

In manufacturing a glass ribbon continuously by feeding molten glass from a glass melting furnace onto a molten metal bath and advancing the glass thereover, a flow of the molten metal, whose direction of flow is from the inlet for the molten glass to the outlet for the glass ribbon, is set up underneath the glass ribbon in concomitance with the movement of the glass ribbon. Hence, a return flow of the molten metal occurs at that part outside the two side edges of the glass ribbon, which flows in a direction opposite to that of the direction of advance of the glass ribbon, i.e. from the outlet for the glass ribbon to the inlet for the molten glass. This phenomenon is especially pronounced when manufacturing thick flat glass, i.e. when dams defining the path for the glass have been provided in the bath.

For forming and solidifying the molten glass, the molten metal bath is provided with an optimum temperature gradient extending from the inlet for the molten glass to the outlet for the glass ribbon. Hence, when the aforementioned flow of the molten metal occurs, a meeting of the molten metal of high temperature with that whose temperature is relatively low takes place. Consequently, the temperature of the molten metal bath becomes nonuniform such that variations in the thickness of the glass ribbon appear during its formation to result frequently in nonuniformity of the thickness of the product.

The molten metal bath is usually covered with a nonoxidizing gas. Hence, when the molten metal of elevated temperature in which this gas is in solution flows into a zone of relatively low temperature at the underside of the glass ribbon and becomes cooled, the gas becoming supersaturated is liberated to become the cause of defects which appear in the glass ribbon surface in the form of bubbles.

The molten metal that is usually used is either molten tin or molten tin alloy. In this case, if the molten metal circulates inside the molten metal bath, the oxides of tin which tend to form at the low-temperature region will flow to the high-temperature region and cause a defect to occur in the glass ribbon by adhering to the underside of the glass.

The object of the present invention resides in preventing the aforementioned drawbacks by controlling the flow of the molten metal in the bath thereof and to provide an apparatus for use in the continuous manufacture of glass ribbon during which molten glass is fed onto a bath of molten metal and advanced over the bath, which comprises a tank for holding the bath and a pair of dams disposed spaced apart from the sidewalls and end walls of the tank and rising from the bottom of the tank with their top above the level of the bath, said pair of dams extending for a substantial length longitudinally of the tank thereby constituting a path for the glass ribbon on the bath therebetween, characterized in that means for controlling the flow of the molten metal is provided between each sidewall of the tank and the dam which faces it.

Figure 2:
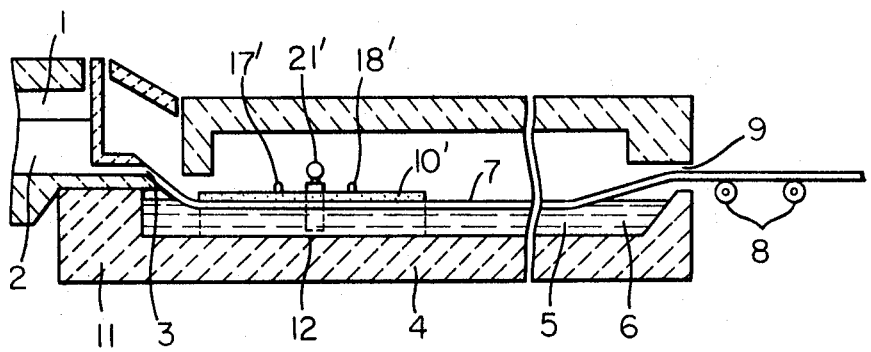
Figure 3:
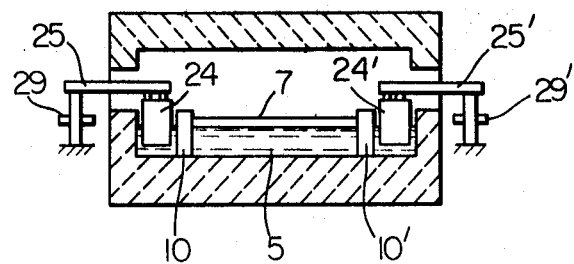
Figure 4:
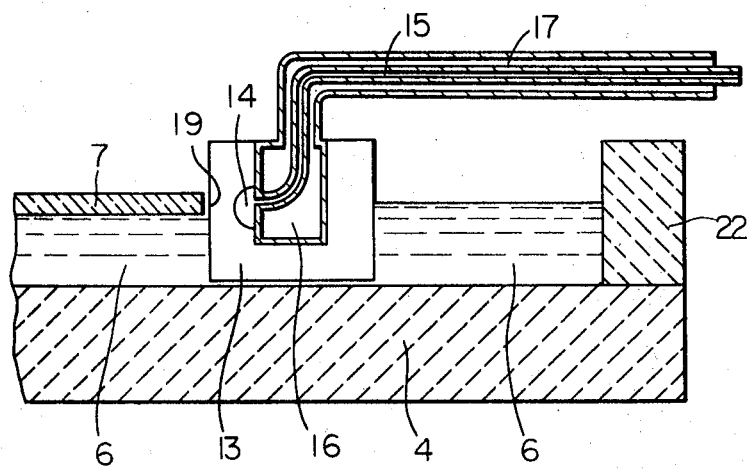

In one of the embodiments of the present invention, at least that part of the foregoing dams facing the side edges of the glass ribbon floating atop the bath can be made of a gas-permeable porous material, and a cavity can be provided inside this porous part, which extends along the entire length of the porous part. A conduit can then be provided communicating with said cavity for introducing a pressurized gas which is to be blown out from the porous part against the side edges of the glass ribbon on the bath. Further, the dams can be equipped with a cooling box therein, the cooling box being provided with a pair of pipes, one for introducing a cooling medium thereinto and another for removing the cooling medium therefrom. The foregoing conduit for introducing a pressurized gas into the aforesaid cavity can be so designed to pass through the inside of one of these pipes which circulate a cooling medium. An illustrative embodiment of the invention will now be described with reference to the accompanying drawings; in which:

FIG. 1 is a plan view which schematically illustrates one embodiment of the present invention, FIG. 2 being a side view in longitudinal section taken along line A—A' of FIG. 1, FIG. 3 being a cross-sectional side view taken along line B—B' of FIG. 1, and FIG. 4 being a partial cross-sectional side view on a magnified scale of a dam 10 taken along C—C' of FIG. 1; and FIGS. 5–7 are drawings for illustrating the means employed in the present invention for controlling the flow of the molten metal, FIG. 5 being a perspective view of a damper 21, FIG. 6 being a plan view of a modification of the damper 21, and FIG. 7 being a side view of a puddle roller apparatus 36.

Referring to FIGS. 1–3, molten glass 2 melted at a glass-melting furnace 1 is fed onto molten metal 5 contained in a tank 4. Molten glass 2 fed onto the molten metal 5 splays atop the molten metal 5 and advances over the molten metal bath 6 to become hardened while forming a glass ribbon 7. It is then conveyed out of the tank 4 of molten metal via a glass ribbon outlet 9 of said tank by means of a conveyor 8 of a lehr.

Reference numerals 10, 10' denote a pair of dams which are provided alongside the two side edges of the glass ribbon 7 spaced apart from the end wall 11 at the glass inlet side as well as the sidewalls 22, 22' of the tank 4 for the molten metal, and extend down to the floor of the tank 4. While dams 10, 10' substantially touch (though there is a slight clearance) the side edges of the glass ribbon in manufacturing a thick glass (e.g. 7 mm. or more), they usually do not touch the side edges of the glass ribbon in manufacturing a thin glass (e.g. 6 mm. or less).

FIG. 4 illustrates the construction of the dam 10. Dam 10 has a outer porous wall 13 of graphite, and in the interior of the wall 13 facing the side edge of the glass ribbon there is provided a pressure chamber 14 which extends longitudinally of the porous wall 13. A conduit 15 communicates with the pressure chamber 14. A cooling box 16 is provided inside the dam 10 and has pipes 17, 18 in communication therewith. A gas is introduced under pressure via the conduit 15 to the pressure chamber 14 located at the inner side of the porous wall 13 and blown out from a surface 19 facing the side edges of the glass ribbon. As a result of this jet pressure, a slight clearance is set up between the surface 19 of the aforesaid wall and the side edges of the glass ribbon to prevent the sticking of the side edges of the glass ribbon to the dam 10. Porous wall 13 is cooled by introducing cooling water into the cooling box 16 via the pipe 17 and removing it therefrom via the pipe 18. To preclude the oxidation of the molten metal, the gas to be introduced into the dam 10 is preferably a nonoxidizing gas, e.g. nitrogen gas. The pressure at which the gas is introduced when the porous wall is 5–16 mm. thick and has a porosity of 15–30 percent is conveniently 0.01–1 kilogram per square centimeter and the rate of flow of the gas is suitably 100–5,000 cc. per hour.

In the passages 23, 23' of the molten metal 5 formed respectively by the dams 10, 10' and the sidewalls 22, 22' of the tank 4 are provided a pair of dampers 21, 21' which are dipped into the molten metal in such a fashion as to obstruct the flow of the molten metal. The construction of the dampers 21, 21' is shown in FIG. 5. The damper proper 24 of graphite is supported by a supporting tube by way of bolts 26, 27. A pipe 28 for supplying cooling water is provided inside the supporting tube 25 thereby accomplishing the water cooling of the supporting tube 25. Supporting tubes 25, 25' are each supported externally of the tank containing the molten metal, and the depth to which the dampers proper 24, 24' are dipped into the molten metal 5 is adjustable by means of adjusting screws 29, 29' (FIG. 3) which raise or lower the supporting tubes 25, 25'.

In manufacturing a glass ribbon, the molten metal below the glass ribbon, tends to flow in the direction of arrow 30 along with the glass ribbon 7. As a result, a return flow tends to be created flowing through the passages 23, 23' of the molten metal 5 in the direction indicated by arrows 31, 31'. According to the apparatus of the present invention, as hereinbefore described, this return flow is obstructed and hence the flow of the molten metal in the direction of arrow 30 is weakened. The extent to which the return flow indicated by arrows 31, 31' as well as the extent to which the flow of the molten metal indicated by arrow 30 is controlled can be adjusted by adjusting the depth to which the dampers 21, 21' is dipped by means of the screws 29, 29'. The flow of the molten metal of low temperature returning to the neighborhood of the glass inlet 3 is reduced by the apparatus of the present invention. That is to say, the flow that makes its way under the glass ribbon as indicated by arrows 32, 32' is reduced, with the consequence that the flat glass in the process of being formed is not subjected to temperature irregularities. Thus, the manufacture of flat glass of uniform thickness is made possible. Furthermore, the formation of bubbles in the molten metal bath is reduced as a result of the weakening of the flow of the molten metal indicated by arrow 30, thus reducing the defect in the form of bubbles on the glass surface. In addition, the conveyance of the oxides of the molten metal to the high-temperature region of the bath is lessened, as a consequence, the defect of the surface of the glass ribbon ascribable to oxides is reduced.

When manufacturing thin flat glass in the foregoing apparatus, since the side edges of the glass ribbon 7 do not come into contact with the dams 10, 10', the dams need not be of porous material and the usual refractory materials can be used. Further, neither is it necessary to feed a pressurized gas. Further, instead of the dampers 21, 21', a pair of dampers 33, 34 of optional immersion depth, such as shown in FIG. 6, can be provided, and the return flow in the direction of arrow 31 and the flow of molten metal indicated by arrow 30 can be controlled by moving the damper 34 in the direction of arrow 35.

Again, as shown in FIG. 7, a puddle roller device 36 can be used instead of the dampers 21, 21'. In FIG. 7 a shaft 38 of a puddle roller 37 of graphite inserted from a sidewall 22 of a tank 4 for the molten metal is journaled rotatably in a pillow block 40 atop a supporting block 39 and also rotatably supported above the sidewall 22 of tank 4 by means of a graphite sleeve 41. Shaft 38 is water cooled by disposing therein a water-cooling inner tube 42. Puddle roller 37 is rotated by an electric motor 44 through the intermediary of a sprocket wheel 43 secured to the shaft 38, a sprocket wheel 43' secured to a rotating shaft of the motor 44 and a chain 45. The speed of the motor 44 is variable and it can also be operated in reverse, but it is usually rotated in a direction which obstructs the return flow, i.e. in counter to the direction of flow indicated by arrow 31 (FIG. 1).

If the rotational speed of the puddle roller 37 is raised sufficiently high, a flow of the molten metal in a direction opposite to that indicated by arrow 31 is set up. As a result, it is also possible to set up a flow of the molten metal in a direction opposite to that indicated by arrow 30.

In most cases when the operation is carried out such that the flow of the molten metal indicated by arrow 30 is either reduced or eliminated, a striking improvement can be achieved. However, it was found that when the glass ribbon in the widthwise direction is thinner in the middle than at the side edges, this can be corrected by operating such that a flow in a direction opposite to that indicated by arrow 30 is set up, and thus a product uniform in thickness in the widthwise direction can be obtained. This can be achieved, for instances, by raising the rotational speed of the puddle roller 37 to a sufficiently high degree. When a flow of the molten metal in a direction opposite to that indicated by arrow 30 is set up below the glass ribbon, a flow in a direction opposite to that indicated by arrows 32, 32' is set up, with the consequence that the molten metal of elevated temperature at the middle part of the tank 4 spreads out to the two sides of the glass ribbon which tend to become cooled. It is believed that the uniformity of thickness is thus achieved. On the other hand, when the thickness in the widthwise direction is thicker at the middle than at the side edges of the glass ribbon obtained, the operation should rather be carried out in a manner such that the flow of the molten metal as indicated by arrow 30 as well as the return flow as indicated by arrow 31 is promoted. The terminology, "Controlling the flow of the molten metal," as used herein and the appended claims is meant to refer to either reducing, stopping or promoting the flow of the molten metal.

The material of which the puddle roller is constructed is not limited to graphite but the usual refractory materials or the metals such as spheroidal graphite cast iron may also be used. Further, it is also possible to use instead of the puddle roller device 36 a linear motor for setting up a forced flow in the molten metal by means of electromagnetic force.

We claim:

1. An apparatus for use in the continuous manufacture of a glass ribbon during which molten glass is fed onto a bath of molten metal and advanced over the bath, which apparatus comprises a tank for holding the bath; a bath of molten metal; a pair of elongated dams disposed in a spaced relationship from sidewalls and end walls comprising said tank and rising from a bottom of the tank to an elevation topping the level of said bath, said pair of dams extending longitudinally of said tank for a substantial distance along its length and thus constituting a first path between said dams for the glass ribbon atop the bath, and second paths between opposite sidewalls of the tank, and the respective dams; and means engageable with said molten metal for controlling the longitudinal flow of molten metal in said second paths, said controlling means comprising a damper member of generally rectangular planar form having the major plane disposed transversely to said second paths for obstructing a part of said second paths, and means for adjustably supporting said dampers.

2. The apparatus according to claim 1, wherein said means for adjustably supporting said dampers includes elongated supporting member means for supporting said damper and an adjusting member connected to said elongated supporting member for raising or lowering said supporting member, whereby the flow of the molten metal in said second path is controlled by the immersion depth of said damper.

3. The apparatus according to claim 1, further including a second damper to comprise a pair of adjacently disposed dampers in each second path for controlling the flow of molten metal, and including means for effecting selective relative movement of said dampers in the transverse direction.

4. The apparatus according to claim 1, wherein at least that part of each dam facing the side edge of the glass ribbon the bath is made of a gas-permeable porous material, each dam having in the inside of the porous part a cavity extending along its length, and a conduit communicating with said cavity for introducing a pressurized gas into said cavity so as to cause the gas to be blown out through and away from said porous part against the side edge of the glass ribbon on the bath.

5. The apparatus according to claim 1, wherein each of the said dams has in the interior thereof a cooling box for cooling said dams, said box having a pipe for introducing a cooling medium thereinto and a pipe for removing the cooling medium therefrom.

6. An apparatus for use in the continuous manufacture of a glass ribbon during which molten glass is fed onto a bath of molten metal and advanced over the bath, which apparatus comprises a tank for holding the bath; a bath of molten metal; a pair of elongated dams disposed in a spaced relationship from sidewalls and end walls comprising said tank and rising from a bottom of the tank to an elevation topping the level of said bath, said pair of dams extending longitudinally of said tank for a substantial distance along its length and thus constituting a first path between said dams for the glass ribbon atop the bath, and second paths between opposite sidewalls of the tank and the respective dams; and means engageable with said molten metal for controlling the longitudinal flow of molten metal in each of said second paths; said controlling means comprising means to set up a longitudinal forced flow of the molten metal in said second paths.

7. The apparatus according to claim 6, wherein said means for setting up the forced flow for controlling the flow of the molten metal comprises a rotatably mounted puddle roller, with the flow of the molten metal in the second path being controlled by means for changing the rotation rate of said puddle roller.

8. The apparatus according to claim 6, wherein said means for setting up the forced flow for controlling the flow of the molten metal comprises a rotatably mounted puddle roller, with the flow of the molten metal in the second path being controlled by means for changing the rotation direction of said puddle roller.

9. The apparatus according to claim 6, wherein said means for setting up the forced flow for controlling the flow of the molten metal comprises a puddle roller rotatably mounted, and the flow of the molten metal in the second path is controlled by means for changing the rotation rate and the rotation direction of said puddle roller.

10. The apparatus according to claim 6, wherein at least that part of each dam facing the side edge of the glass ribbon the bath is made of a gas-permeable porous material, each dam having in the inside of the porous part a cavity extending along its length, and a conduit communicating with said cavity for introducing a pressurized gas into said cavity so as to cause the gas to be blown out through and away from said porous part against the side edge of the glass ribbon on the bath.